Oct. 27, 1931.                B. LASKIN                1,828,812

SPLICE FOR ELASTIC WEBBING

Filed Dec. 20, 1930

INVENTOR
Benjamin Laskin
BY John D. Myers
ATTORNEY

WITNESS
F. J. Hartman.

Patented Oct. 27, 1931

1,828,812

UNITED STATES PATENT OFFICE

BENJAMIN LASKIN, OF PHILADELPHIA, PENNSYLVANIA

SPLICE FOR ELASTIC WEBBING

Application filed December 20, 1930. Serial No. 503,696.

The present invention relates to elastic webbing and particularly to an improved splice for such elastic webbing.

Heretofore the joining of ends of elastic webbing has tended to injure and break the strands or so-called threads of rubber embodied in the webbing, with the result that upon the subsequent stretching of the webbing and tension being thus applied to the rubber threads, the broken rubber threads have tended to "creep" lengthwise away from the joint and protrude through the webbing, thereby not only detracting from its appearance but weakening its elastic structure and reducing its useful life.

The object of this invention is to join the ends of elastic webbing in an improved manner so as to overcome the foregoing objections; to permit the joint to be easily and cheaply effected; and to provide a joint which is both strong and durable and at the same time neat in appearance.

The various features of novelty which characterize my invention are pointed out with particularity in the claims annexed to and forming a part of this specification. For a better understanding of the invention, however, and the advantages possessed by it, reference should be had to the following descriptive matter and accompanying drawings, in which I have described and illustrated one embodiment of my invention:

My invention is applicable to various forms of elastic webbing having a plurality of parallel strands or so-called threads of elastic rubber incorporated therein and running longitudinally thereof, with the adjacent rubber threads, or at least some of them, spaced apart transversely.

In the present instance I have shown a webbing containing eight (8) rubber threads, all spaced apart transversely, except two of such rubber threads which are arranged against each other and extend side by side along the middle of the webbing. However, this is merely for the purpose of illustration and it is to be understood that webbing having any desired number of threads and any suitable arrangement thereof may be used.

Figure 1:
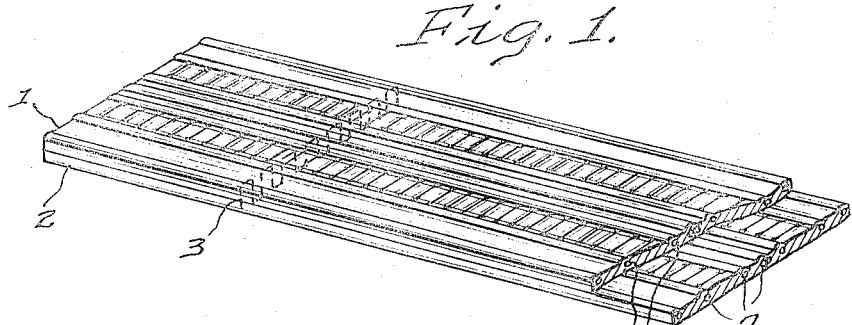
Fig. 1 is a fragmentary perspective view, showing the ends of the webbing superimposed and connected by a transverse row of stitching.

According to my invention, two ends of webbing to be joined, which are designated 1 and 2, respectively are placed one upon the other in longitudinal alinement, with their fronts or faces together and with their extremities substantially flush with each other. A row of preferably light stitching 3 is run transversely across such superimposed webbing ends at a suitable distance from their extremities, as shown in Fig. 1, so as to form a seam connecting the webbing ends together.

Figure 2:
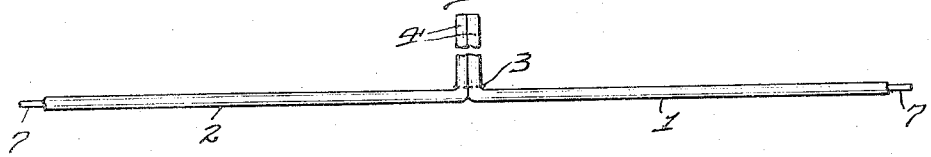
Fig. 2 is a side elevation showing the webbing ends spread apart or opened.
Figure 3:
Fig. 3 is a similar view showing the seam opened to provide the turn-back portions.
Figure 4:
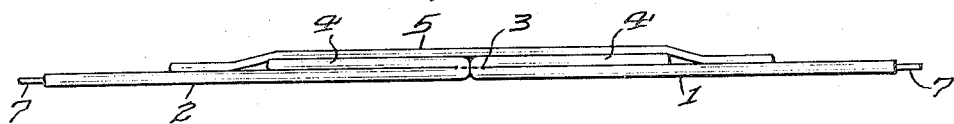
Fig. 4 is a similar view showing the backing and reinforcing strip applied over the turn-back portions.

The webbing ends are then spread apart or opened, as shown in Fig. 2, to bring their fronts or faces to the outside, and the seam is opened, as shown in Fig. 3, so that the terminal portions of the webbing are folded or doubled over against the backs of the corresponding webbing ends and form turnback portions 4. The length of the turnback portions may be varied according to the size and strength of the webbing, by suitably locating the stitching 3.

A backing and reinforcing strip 5 of any desired inelastic and substantially non-stretchable fabric which has suitable strength and durability, is applied over the turnback portions 3 to span the seam. This strip is preferably of the same width as the webbing and of a length to extend a short distance beyond the extremities of the respective turnback portions.

Figure 5:
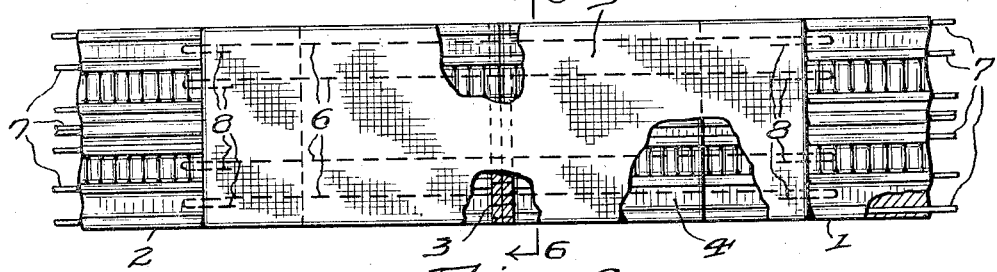
Fig. 5 is a fragmentary plan view showing the backing and reinforcing strip stitched into position.
Figure 6:
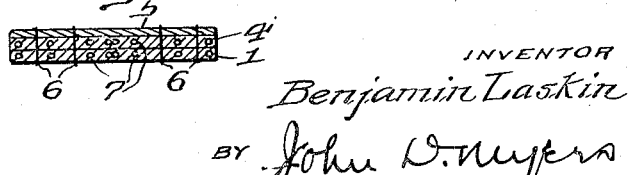
Fig. 6 is a transverse section on line 6—6 of Fig. 5.

The backing and reinforcing strip is stitched in position to complete the joint, and the manner of effecting this is an important feature of the present invention. A suitable number of longitudinal rows of stitching 6 is employed. Each row extends lengthwise across the seam formed by the transverse row of stitching 3; passes through the backing strip 5, the turn-back portions 4 and the webbing ends 1 and 2; and is located between adjacent transversely spaced rubber threads 7 in the webbing. (See Figs. 5 and 6.)

I preferably, although not necessarily, start each row of stitching 6 inside of an end edge of the backing strip 5; run the stitching longitudinally across such edge to a point a short distance beyond the same; then reverse the stitching upon itself and run it longitudinally in the opposite direction onto the backing strip and throughout the length thereof and to a point a short distance beyond the other end edge of the backing strip; again reverse the stitching upon itself and run it longitudinally in the opposite direction onto the backing strip; and stop or finish it off within the adjacent end edge of such backing strip, so that both the starting and finishing ends 8 of each row of stitching 6 are inside, i. e. within the area, of the backing strip.

While I have shown in the present instance four (4) longitudinal rows of stitching 6 this is, of course, merely by way of illustration as the number of such rows may be increased or decreased as occasion requires.

By running this stitching longitudinally, parallel to the rubber threads and between them, none of the rubber threads are crossed thereby and hence there is no likelihood of the needle employed in such stitching injuring and perhaps breaking the rubber threads.

As the longitudinal stitching holds the webbing ends 1 and 2 firmly to the inelastic and substantially non-stretchable backing strip 5, the portions of the webbing lying inside of and between the opposite end edges of the backing strip are prevented from stretching and form what may be termed a "dead" area adjacent the joint. By virtue of this "dead" area the portions of the rubber threads lying within such area are substantially relieved of tension when the webbing is stretched from time to time, and hence any rubber threads which may have been injured or broken in the running of the transverse row of stitching 3, will remain in place and have no tendency to "creep".

Through having the longitudinal rows of stitching begin and end inside of the "dead" area, strain on such stitching upon the stretching of the webbing is minimized, and the stitching will not tend to pull out and unravel, as would be the case if it started and stopped outside of the "dead" area and in the stretchable part of the webbing.

This invention, therefore, not only provides a simple, strong, effective and neat joint between the webbing ends, but also safeguards the rubber threads and obviates the danger of their "creeping" away from the joint in the stretching of the webbing from time to time. Both the elastic structure of the webbing and its appearance are thus preserved, and its useful life prolonged. Furthermore, it will be apparent that the method of forming the joint may be easily and cheaply practiced.

It is to be understood that various changes may be made in the present embodiment of the invention without departing from the spirit thereof and its scope as defined in the appended claims.

Having thus described my invention, I claim and desire to protect by Letters Patent of the United States:

1. The combination with two ends of elastic webbing to be secured together with their elastic threads substantially matching, of an inelastic backing strip bridging the joint between such ends, and stitching arranged parallel to and between adjacent elastic threads of webbing and extending through the backing strip and said webbing ends, on opposite sides of the joint.

2. The combination with two ends of elastic webbing to be secured together, having turn-back portions at the joint therebetween, of an inelastic backing strip extending over said turn-back portions and bridging the joint, and one or more rows of stitching extending longitudinally across the joint and through the backing strip, the webbing ends, and the turn-back portions thereof, said stitching being arranged parallel to and between adjacent rubber threads of the webbing.

3. The combination with two ends of elastic webbing to be secured together, of a transverse row of stitching forming a seam connecting such webbing ends, and also providing turn-back portions on the respective webbing ends at the back thereof and on opposite sides of the seam, an inelastic backing strip extending over the turn-back portions and bridging the seam, and one or more rows of stitching extending longitudinally across the seam and through the backing strip, the turn-back portions and the said webbing ends and arranged parallel to and between adjacent rubber threads of the webbing.

4. The combination with two ends of elastic webbing to be secured together, of an inelastic backing strip bridging the joint therebetween, and one or more rows of stitching extending longitudinally across the joint and through the backing strip and the said webbing ends and arranged parallel to and between adjacent rubber threads of webbing, each longitudinal row of stitching having its starting and stopping points within the area of the backing strip.

5. The combination with two ends of elastic webbing to be secured together, of an inelastic backing strip bridging the joint therebetween, and one or more rows of stitching extending longitudinally across the joint and through the backing strip and the said webbing ends and arranged parallel to and between adjacent rubber threads of webbing, each longitudinal row of stitching extending beyond the opposite ends of the backing strip and being reversed upon itself with its starting and stopping points within the area of the backing strip.

6. The combination with two ends of elastic webbing to be secured together, of a transverse row of stitching forming a seam connecting such webbing ends, and also providing turn-back portions on the respective webbing ends at the back thereof and on opposite sides of the seam, an inelastic backing strip extending over the turn-back portions and bridging the seam, and one or more rows of stitching extending longitudinally across the joint and through the backing strip, the turn-back portions and the said webbing ends and arranged parallel to and between adjacent rubber threads of the webbing, each longitudinal row of stitching having its starting and stopping points within the area of the backing strip.

7. The combination with two portions of material to be secured together, one of which is of elastic webbing having its elastic threads running toward the joint, of an inelastic backing strip bridging the joint between such portions, and stitching extending through such backing strip and said portions, on opposite sides of the joint, the stitching which extends through the backing strip and the portion of the material which is of elastic webbing, being arranged parallel to and between adjacent elastic threads of such webbing.

8. The combination with two portions of material to be secured together, one of which is of elastic webbing having its elastic threads running toward the joint, of an inelastic backing strip bridging the joint between such portions, and stitching extending through such backing strip and said portions, on opposite sides of the joint, the stitching which extends through the backing strip and the portion of material which is of elastic webbing, being arranged parallel to and between adjacent elastic threads of such webbing, and any terminals of such stitching on the elastic webbing side of the joint being within the area of the backing strip.

In testimony whereof, I have signed my name to this specification.

BENJAMIN LASKIN.